US012614679B2

(12) United States Patent
Yoshimura et al.

(10) Patent No.: US 12,614,679 B2
(45) Date of Patent: Apr. 28, 2026

(54) ELECTRODE FOIL FOR ELECTROLYTIC CAPACITOR, ELECTROLYTIC CAPACITOR, METHOD FOR PRODUCING ELECTRODE FOIL FOR ELECTROLYTIC CAPACITOR, AND METHOD FOR PRODUCING ELECTROLYTIC CAPACITOR

(71) Applicant: Panasonic Intellectual Property Management Co., Ltd., Osaka (JP)

(72) Inventors: Mitsuhisa Yoshimura, Osaka (JP); Miwa Ogawa, Osaka (JP); Naomi Kurihara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 118 days.

(21) Appl. No.: 18/696,846

(22) PCT Filed: Sep. 28, 2022

(86) PCT No.: PCT/JP2022/036200
§ 371 (c)(1),
(2) Date: Mar. 28, 2024

(87) PCT Pub. No.: WO2023/054481
PCT Pub. Date: Apr. 6, 2023

(65) Prior Publication Data
US 2024/0395471 A1 Nov. 28, 2024

(30) Foreign Application Priority Data
Sep. 30, 2021 (JP) .................................. 2021-161958

(51) Int. Cl.
*H01G 9/055* (2006.01)
*H01G 9/00* (2006.01)
(Continued)

(52) U.S. Cl.
CPC ........... *H01G 9/055* (2013.01); *H01G 9/0032* (2013.01); *H01G 9/07* (2013.01); *H01G 9/151* (2013.01); *H01G 9/26* (2013.01)

(58) Field of Classification Search
None
See application file for complete search history.

(56) References Cited

U.S. PATENT DOCUMENTS

2008/0285210 A1* 11/2008 Oh ....................... H01G 9/0032
29/25.03
2020/0006011 A1 1/2020 Ogawa et al.
(Continued)

FOREIGN PATENT DOCUMENTS

JP S63304613 A * 12/1988
JP S6428909 A * 1/1989
(Continued)

OTHER PUBLICATIONS

Translation JP 6428909A (no date).*
(Continued)

*Primary Examiner* — Eric W Thomas
(74) *Attorney, Agent, or Firm* — Rimon P.C.

(57) ABSTRACT

An electrode foil for an electrolytic capacitor includes: a metal foil with a first main surface and a second main surface that is opposite to the first main surface, having a first porous portion on the first main surface side and a second porous portion on the second main surface side; a first dielectric layer that covers a surface of the first porous portion; and a second dielectric layer that covers a surface of the second porous portion. A thickness F1 of the first dielectric layer and a thickness F2 of the second dielectric layer satisfy the relationship $0.75 \leq F1/F2 \leq 0.97$.

33 Claims, 5 Drawing Sheets

(51) Int. Cl.
    *H01G 9/07*       (2006.01)
    *H01G 9/15*       (2006.01)
    *H01G 9/26*       (2006.01)

(56)            References Cited

U.S. PATENT DOCUMENTS

2020/0373090 A1   11/2020  Yoshimura et al.
2022/0115185 A1    4/2022  Kurihara et al.

FOREIGN PATENT DOCUMENTS

WO      2018/180029 A1   10/2018
WO      2019/167773 A1    9/2019
WO      2020/171114 A1    8/2020

OTHER PUBLICATIONS

Translation JP 63304613A (no date).*
International Search Report dated Nov. 29, 2022 issued in International Patent Application No. PCT/JP2022/036200, with English translation.

* cited by examiner

ELECTRODE FOIL FOR ELECTROLYTIC CAPACITOR, ELECTROLYTIC CAPACITOR, METHOD FOR PRODUCING ELECTRODE FOIL FOR ELECTROLYTIC CAPACITOR, AND METHOD FOR PRODUCING ELECTROLYTIC CAPACITOR

CROSS-REFERENCE OF RELATED APPLICATIONS

This application is the U.S. National Phase under 35 U.S.C. § 371 of International Patent Application No. PCT/JP2022/036200, filed on Sep. 28, 2022, which in turn claims the benefit of Japanese Patent Application No. 2021-161958, filed on Sep. 30, 2021, the entire disclosures of which applications are incorporated by reference herein.

TECHNICAL FIELD

The present disclosure relates to an electrode foil for an electrolytic capacitor, an electrolytic capacitor, a method for producing an electrode foil for an electrolytic capacitor, and a system for producing an electrode foil for an electrolytic capacitor.

BACKGROUND ART

An electrode foil for an electrolytic capacitor includes: a metal foil (etched foil) with both surfaces roughened through etching; and dielectric layers respectively covering the surfaces of the etched foil. Formation of the dielectric layers through chemical conversion treatment (anodic oxidation) on the etched foil is advantageous in terms of mass production. On the other hand, although techniques for forming dielectric layers by atomic layer deposition and the like have been considered, there are issues in terms of mass production.

PTL 1 (WO 2018/180029) proposes a method for producing an electrode, including: a step (i) of preparing a core portion and a porous body that is made of a first metal in one piece with the core portion; a step (ii) of forming a first dielectric layer containing an oxide of the first metal and covering at least part of the porous body, through chemical conversion on the porous body; and a step (iii) of forming a second dielectric layer containing an oxide of a second metal that is different from the first metal and covering at least part of the first dielectric layer, through atomic layer deposition.

CITATION LIST

Patent Literature

PTL 1: WO 2018/180029

SUMMARY OF INVENTION

Technical Problem

During production of electrolytic capacitors (or electrode foils), electrode foils may be curved. The electrode foils are curved, for example, when they are formed into wound bodies or when they are conveyed or wound by a roller.

In an electrode foil, tensile stress is likely to be generated on a surface thereof that becomes convex when the electrode foil is curved, which is likely to cause cracking and to damage the dielectric layer on that surface. Furthermore, foil breakage starting from the cracking (a damaged point of the dielectric layer) may occur.

Meanwhile, in recent years, there has been increasing demand for higher capacitance in electrode foils. One possible method for forming a dielectric layer that is advantageous for higher capacitance is to form a layer of metal oxide with high permittivity on the surface of an etched foil through atomic layer deposition and then enhance the crystallinity of the layer through heat treatment. However, the dielectric layer formed using this method is more brittle and has lower adhesiveness to the etched foil, the dielectric layer on a surface that becomes convex when the electrode foil is curved is more likely to be damaged, and the electrode foil has lower reliability, compared with a dielectric layer (chemical conversion film) formed through chemical conversion treatment.

Solution to Problem

An aspect of the present disclosure relates to an electrode foil (a first electrode foil) for an electrolytic capacitor, including a metal foil with a first main surface and a second main surface that is opposite to the first main surface, having a first porous portion on the first main surface side and a second porous portion on the second main surface side; a first dielectric layer that covers a surface of the first porous portion; and a second dielectric layer that covers a surface of the second porous portion, wherein a thickness $F1$ of the first dielectric layer and a thickness $F2$ of the second dielectric layer satisfy a relationship: $0.75 \leq F1/F2 \leq 0.97$ Another aspect of the present disclosure relates to an electrode foil (a second electrode foil) for an electrolytic capacitor, including a metal foil with a first main surface and a second main surface that is opposite to the first main surface, having a first porous portion on the first main surface side and a second porous portion on the second main surface side; a first dielectric layer that covers a surface of the first porous portion; and a second dielectric layer that covers a surface of the second porous portion, wherein a capacitance $C1$ that appears on the first main surface side having the first dielectric layer and a capacitance $C2$ that appears on the second main surface side having the second dielectric layer satisfy a relationship: $0.80 \leq C2/C1 \leq 0.99$.

Another aspect of the present disclosure relates to an electrode foil (a third electrode foil) for an electrolytic capacitor, wherein the metal foil of the above-described first or second electrode foil has an anode extraction portion and a cathode forming portion, and, in the cathode forming portion, the surface of the first porous portion and the surface of the second porous portion are respectively covered with the first dielectric layer and the second dielectric layer.

Another aspect of the present disclosure relates to an electrolytic capacitor including: a wound body; and an electrolyte, wherein the wound body is obtained by winding together an anode foil, a cathode foil, and a separator that is interposed between the anode foil and the cathode foil, and the anode foil is the above-described first or second electrode foil.

Another aspect of the present disclosure relates to an electrolytic capacitor including a stack in which a plurality of capacitor elements each including an anode body and a cathode portion are stacked, the anode body having an anode extraction portion and a cathode forming portion, and the cathode portion covering the cathode forming portion, wherein the stack has an anode stacked portion in which a plurality of the anode extraction portions are stacked and a cathode stacked portion in which a plurality of the cathode forming portions each covered with the cathode portion are stacked, and at least one of the anode bodies of the plurality of capacitor elements is the above-described third electrode foil.

Another aspect of the present disclosure relates to a method for producing an electrode foil for an electrolytic capacitor, including: a first step of preparing a metal foil with a first main surface and a second main surface that is opposite to the first main surface, having a first porous portion on the first main surface side and a second porous portion on the second main surface side; and a second step of individually forming a first dielectric layer that covers a surface of the first porous portion and a second dielectric layer that covers a surface of the second porous portion.

Another aspect of the present disclosure relates to a system for producing an electrode foil for an electrolytic capacitor, including a film-forming portion that performs atomic layer deposition on a metal foil with a first main surface and a second main surface that is opposite to the first main surface, having a first porous portion on the first main surface side and a second porous portion on the second main surface side, thereby individually forming a first dielectric layer that covers a surface of the first porous portion and a second dielectric layer that covers a surface of the second porous portion.

Advantageous Effects of Invention

According to the present disclosure, it is possible to provide an electrode foil for an electrolytic capacitor, with high capacitance and excellent reliability.

Although novel features of the present disclosure are described in the attached claims, the following detailed description referring to the drawings together with other objects and features of the present disclosure will further facilitate understanding of both the configuration and the content of the present disclosure.

BRIEF DESCRIPTION OF DRAWINGS

FIG. 1 is a cross-sectional schematic diagram of a metal foil that is prepared in a first step of a method for producing an electrode foil for an electrolytic capacitor according to an embodiment of the present disclosure.

DESCRIPTION OF EMBODIMENTS

Figure 2:
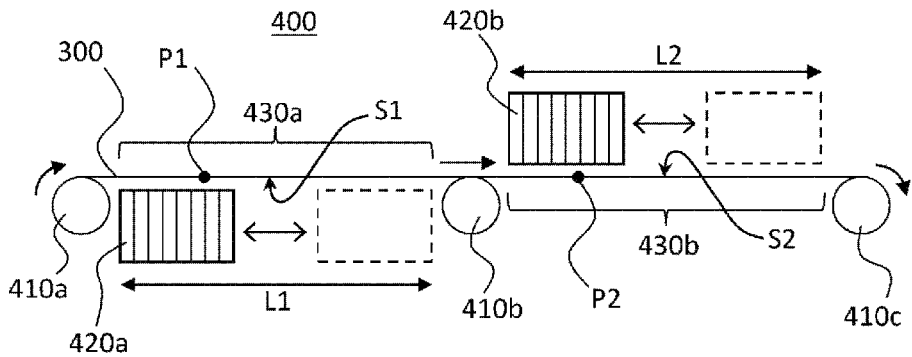
FIG. 2 is a configuration diagram showing an example of a system for producing an electrode foil for an electrolytic capacitor according to an embodiment of the present disclosure.

The following describes examples of embodiments of the present disclosure, but the present disclosure is not limited to the following examples. In the following description, specific numerical values and materials are described as examples, but it is possible to apply other numerical values and materials as long as effects of the present disclosure can be obtained. In the present specification, the wording "from a numerical value A to a numerical value B" refers to a range that includes the numerical values A and B, and can be read as "the numerical value A or more and the numerical value B or less". When examples of a lower limit value and examples of an upper limit value are described below regarding a specific physical property or condition, any of the examples of the lower limit value and the examples of the upper limit value can be combined unless the lower limit value is larger than or equal to the upper limit value. When a plurality of materials are described as examples, it is possible to use a single material selected therefrom or a combination of two or more materials selected therefrom.

Also, the present disclosure encompasses combinations of matters respectively recited in two or more claims selected from the attached claims. That is to say, it is possible to combine matters respectively recited in two or more claims selected from the attached claims, as long as no technical contradiction arises.

[Method for Producing Electrode Foil for Electrolytic Capacitor]

A method for producing an electrode foil for an electrolytic capacitor according to an embodiment of the present disclosure includes: a first step of preparing a metal foil with a first main surface and a second main surface that is opposite to the first main surface, having a first porous portion on the first main surface side and a second porous portion on the second main surface side; and a second step of individually forming a first dielectric layer that covers a surface of the first porous portion and a second dielectric layer that covers a surface of the second porous portion.

(First Step)

The first porous portion and the second porous portion are formed simultaneously by roughening both surfaces of a substrate sheet containing a first metal through etching, and the portion that has not been etched remains as a core portion. That is to say, the metal foil has a first porous portion and a second porous portion, and a core portion that is continuous with the first porous portion and the second porous portion. The metal foil is a member in which the first porous portion, the second porous portion, and the core portion are included in one piece. Both surfaces of the substrate sheet are simultaneously roughened through etching. The etching may be chemical etching or electrolytic etching. Hereinafter, the first porous portion and the second porous portion may be collectively referred to simply as "porous portions".

Thicknesses T of the porous portions are not particularly limited, and may be selected as appropriate according to the application of the electrolytic capacitor, the required withstand voltage and rated capacitance, and the like. The thickness T of each porous portion may be selected, for example, from a range of 10 μm or more and 160 μm or less. The thickness T of each porous portion may be, for example, $\frac{1}{10}$ or more and $\frac{5}{10}$ or less of the thickness of the metal foil. The thickness T of each porous portion can be determined by cutting the electrode foil (or the metal foil) such that a cross-section in the thickness direction of the core portion and the porous portion is obtained, taking an electron micrograph of the cross-section, and averaging the thicknesses at any 10 points of the porous portion.

The porous portions have a large number of pits (or pores) surrounded by metal portions. The pit diameter peak of the pits (or the pore diameter peak of the pores) included in the porous portions is not particularly limited, but, from the viewpoint of increasing the surface area and forming dielectric layers deep into the porous portions, it may be, for example, 50 to 2000 nm, or 100 to 300 nm. The pit diameter (pore diameter) peak is the most frequent pore diameter of the volume-based pore size distribution as measured, for example, by a mercury porosimeter.

Figure 1:
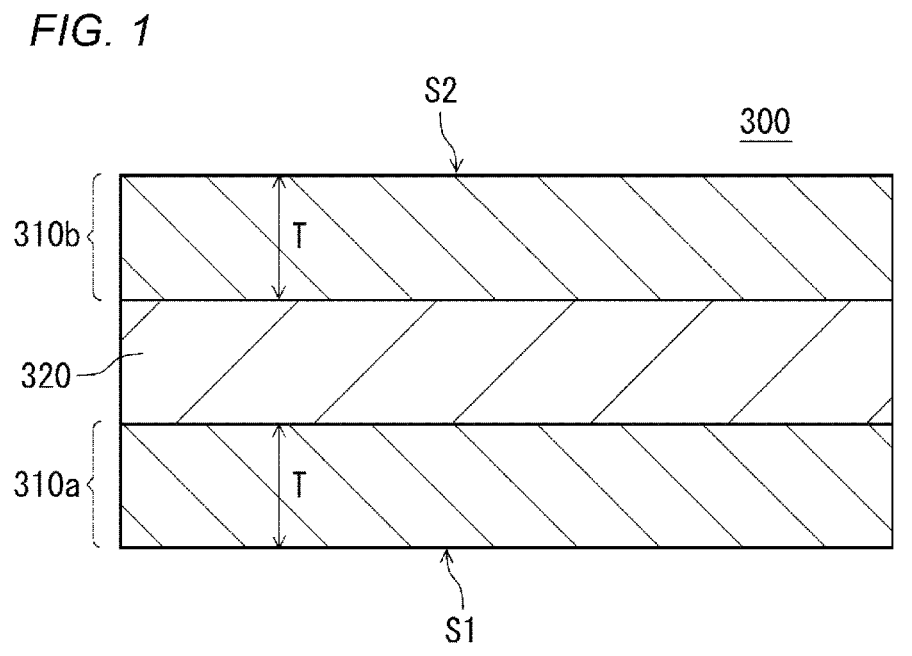

FIG. 1 is a cross-sectional view schematically showing a metal foil that is prepared in the first step of the method for producing an electrode foil for an electrolytic capacitor according to an embodiment of the present disclosure.

A metal foil 300 has a first main surface S1 and a second main surface S2 that is opposite to the first main surface. The metal foil 300 has a first porous portion 310a that is on the first main surface S1 side, a second porous portion 310b that is on the second main surface S2 side, and a core portion 320 that is continuous with the first porous portion 310a and the second porous portion 310b. The first porous portion 310a and the second porous portion 310b have a large number of pits (not shown) surrounded by metal portions. The first porous portion 310a and the second porous portion 310b each have a thickness T.

(Second Step)

In the second step, a first dielectric layer that covers a surface of the first porous portion and a second dielectric layer that covers a surface of the second porous portion are individually formed. That is to say, in the second step, a step of forming a second dielectric layer is provided separately from a step of forming a first dielectric layer, that is, a second dielectric layer is not formed in the step of forming a first dielectric layer, and a first dielectric layer is not formed in the step of forming a second dielectric layer. Hereinafter, the first dielectric layer and the second dielectric layer may be collectively referred to simply as "dielectric layers".

Each dielectric layer is provided so as to cover at least part of the surface of a metal portion constituting a porous portion. The dielectric layer can be formed, for example, through atomic layer deposition (ALD). The dielectric layer may contain an oxide of the first metal contained in the metal portion (the substrate sheet of the first step) constituting the porous portion. The dielectric layer may contain an oxide of a second metal that is different from the first metal. When forming the dielectric layer through ALD, the second metal can be selected as appropriate without being limited by the first metal, and an oxide of the second metal with a higher permittivity than that of the oxide of the first metal can be formed, which is advantageous for increasing the capacitance of the electrolytic capacitor. In addition, because of the wider selection of the second metal, various properties can be given to the dielectric layer without being limited by the first metal.

The type of first metal is not particularly limited, but valve action metals such as aluminum (Al), tantalum (Ta), and niobium (Nb) or alloys containing valve action metals can be used as the first metal.

Examples of the second metal include Al, Ta, Nb, silicon (Si), titanium (Ti), zirconium (Zr), and hafnium (Hf). They may be used alone or in a combination of two or more. That is to say, $Al_2O_3$, $Ta_2O_5$, $Nb_2O_5$, $SiO_2$, $TiO_2$, $ZrO_2$, $HfO_2$, and the like may be contained alone or in a combination of two or more in the dielectric layer. If two or more oxides of the second metal are contained in the dielectric layer, the two or more oxides may be mixed together or each may be arranged in layers. From the viewpoint of increasing the capacitance of the electrolytic capacitor, it is preferable that the oxide of the second metal has a higher relative permittivity than the oxide of the first metal.

Through the second step, a dielectric layer A that is advantageous for higher capacitance can be formed as one of the first dielectric layer and the second dielectric layer, and a dielectric layer B with excellent resistance to tensile stress can be formed as the other of the first dielectric layer and the second dielectric layer. In this case, the formation of the dielectric layer A can increase the capacitance of the electrode foil. In addition, if the electrode foil is curved such that the main surface with the dielectric layer A has a concave shape, damage to the dielectric layer when the electrode foil is curved can be suppressed. That is to say, when the electrode foil is curved, one surface of the electrode foil becomes convex and tensile stress is generated thereon, but, if the one surface is the main surface with the dielectric layer B, damage to the dielectric layer due to the tensile stress is suppressed. On the other hand, the other surface of the electrode foil has a concave shape and compressive stress is generated thereon, and thus, even when the dielectric layer A has relatively lower strength and adhesiveness to the porous portion than the dielectric layer B, damage to the dielectric layer due to tensile stress can be avoided if the other surface is the main surface with the dielectric layer A. Thus, the reliability of the electrode foil is improved.

The second step of individually forming the first dielectric layer and the second dielectric layer can be performed, for example, using a production system, which will be described later. If the dielectric layers are formed through chemical conversion treatment, chemical conversion film are simultaneously formed respectively on both surfaces of the metal foil in a chemical conversion solution. When dielectric layers are formed through ALD, generally, metal oxide films are simultaneously formed respectively on both surfaces of the metal foil housed in a reaction chamber using a film-forming device. In these cases, the step of forming a dielectric layer on one surface of a metal foil also serves as a step of forming a dielectric layer on the other surface, making it difficult to individually form the first dielectric layer and the second dielectric layer.

The second step may include a second A step of forming the first dielectric layer at a first temperature TA1 through ALD and a second B step of forming the second dielectric layer at a second temperature TA2 through ALD. The first temperature TA1 may be the same as or different from the second temperature TA2. It is possible to control the film-forming performance on the first main surface and the second main surface through ALD, by adjusting the first temperature TA1 and the second temperature TA2 as appropriate.

A metal M1 contained in the first dielectric layer may be the same as or different from a metal M2 contained in the second dielectric layer. The metal M1 and the metal M2 may be a second metal that is different from the first metal contained in the metal portion constituting the porous portions. From the viewpoint of higher capacitance, if the first metal is Al, the second metal is preferably Ti, Si, Hf, or Nb. The metal M2 may contain Al and a metal other than Al.

Atomic layer deposition (ALD) is a film forming method in which a dielectric layer containing an oxide of a metal M is formed on the surface of an object by alternately supplying a raw material gas containing the metal M and an oxidant to a reaction chamber in which the object is placed. In the ALD, the metal M is deposited on the surface of the object in atomic layers because of the self-limiting effect. Therefore, the thickness of the dielectric layer is controlled by the number of cycles, where one cycle is set to supply of a raw material gas→exhaust (purge) of the raw material gas→supply of an oxidant→exhaust (purge) of the oxidant. That is to say, ALD can easily control the thickness of the dielectric layer formed.

Examples of the oxidant used in ALD include water, oxygen, and ozone. The oxidant may be supplied to the reaction chamber as plasma generated from the oxidant.

The metal M may contain the first metal or the second metal. The metal M is supplied to the reaction chamber as a precursor gas (raw material gas) containing the metal M. The precursor is, for example, an organometallic compound containing the second metal, which facilitates chemisorption of the metal M onto the object. Various organometallic compounds conventionally used in ALD can be used as the precursor.

Examples of a precursor containing Al include trimethylaluminum $((CH_3)_3Al)$. Examples of a precursor containing Ta include (t-butylimido)tris(ethylmethylamino)tantalum (V) $(C_{13}H_{33}N_4Ta$, TBTEMT), and tantalum (V) pentaethoxide $(Ta(OC_2H_5)_5)$.

Examples of a precursor containing Nb include niobium (V) ethoxide $(Nb(OCH_2CH_3)_5$, and tris(diethylamido)(t-butylimido)niobium(V) $(C_{16}H_{39}N_4Nb)$. Examples of a precursor containing Si include N-sec-butyl(trimethylsilyl) amine $(C_7H_{19}NSi)$, tetraethylsilane $(Si(C_2H_5)_4)$, tetraethoxysilane $(Si(OC_2H_5)_4)$, and silicon tetrachloride $(SiCl_4)$.

Examples of a precursor containing Ti include tetrakis (dimethylamino)titanium(IV) $([(CH_3)_2N]_4Ti$, TDMAT), titanium tetrachloride $(TiCl_4)$, and titanium(IV)ethoxide (Ti $[O(C_2H_5)]_4)$. Examples of a precursor containing Zr include tetrakis(ethylmethylamide)zirconium(IV) $(Zr(NCH_3C_2H_5)_4)$, and zirconium(IV) t-butoxide $(Zr[OC(CH_3)_3]_4)$.

Examples of a precursor containing Hf include hafnium tetrachloride $(HfCl_4)$, tetrakis dimethylamino hafnium (Hf $[N(CH_3)_2]_4)$, and hafnium-t-butoxide $(Hf[OC(CH_3)_3]_4)$.

In the second A step (the second B step), the thickness of the first dielectric layer (the second dielectric layer) may be controlled using the first temperature TA1 (the second temperature TA2). The thickness of the first dielectric layer (the second dielectric layer) may be controlled using the deposition time, the purge time, the number of cycles and the like, in combination with the first temperature TA1 (the second temperature TA2).

The film-forming conditions such as the temperature and pressure during film formation, the type of raw material gas (the metal M), and the number of cycles may be different between the second A step and the second B step.

The second A step may be followed by the second B step. In this case, it is preferable that the second A step also serves as a step of performing heat treatment on the second main surface at the first temperature TA1. In this case, in the second A step, the second main surface is subjected to heat treatment using heat during the film formation on the first main surface. Through the heat treatment, an oxide film of a metal portion constituting the second porous portion can be formed on the surface of the second porous portion. In this case, in the second B step, a second dielectric layer is formed on the surface of the second porous portion such that the oxide film with excellent adhesiveness to the metal portion is interposed therebetween. In this case, the adhesion of the second dielectric layer to the metal portion is improved and the peeling of the second dielectric layer from the surface of the second porous portion is suppressed. While the formation of the oxide film can reduce leakage current, the capacitance on the second main surface side tends to decrease. Thus, the second dielectric layer can be formed as the dielectric layer B with excellent resistance to tensile stress on the second main surface side. The thickness of the oxide film can be controlled by adjusting the first temperature TA1 as appropriate. The oxide film has a thickness of, for example, 90 to 97% of a thickness F2 of the second dielectric layer. The oxide film also functions as a dielectric together with the film formed through ALD.

In the case of electrode foils used for electrolytic capacitors with low withstand voltage (e.g., lower than 16 V), dielectric layers with small thickness (e.g., less than 16 nm) are formed, and thus the effect of such an oxide film is significant, that is, the leakage current reduction effect is remarkable, but the capacitance is likely to decrease. Thus, the effect of individually forming the first dielectric layer and the second dielectric layer is remarkable.

In the case of electrode foils used for electrolytic capacitors with high withstand voltage (e.g., 16V or higher), dielectric layers with large thickness (e.g., 16 nm or more) are formed, and thus the effect of such an oxide film is lowered, and a decrease in the capacitance can be relatively suppressed. In the case of hybrid electrolytic capacitors with higher withstand voltage (e.g., 20V or higher), the effect is even greater.

If the second A step is followed by the second B step, it is preferable that the second B step also serves as a step of performing heat treatment on the first main surface having the first dielectric layer at the second temperature TA2. In this case, in the second B step, the first main surface is subjected to heat treatment using heat during the film formation on the second main surface. Through the heat treatment, the crystallinity of the first dielectric layer can be enhanced. Thus, the first dielectric layer can be formed as the dielectric layer A that is advantageous for higher capacitance on the first main surface side. The crystallinity of the first dielectric layer can be controlled by adjusting the second temperature TA2 as appropriate. While the first dielectric layer serving as the dielectric layer A is more advantageous for higher capacitance than the second dielectric layer serving as the dielectric layer B, it tends to be brittle and its adhesiveness to the porous portion tends to be low.

If the first dielectric layer is formed as the dielectric layer A, it is preferable that a thin oxide film is not substantially formed between the first dielectric layer and the metal portion constituting the porous portion. A thin natural oxide film may exist between the first dielectric layer and the metal portion constituting the porous portion, but it is desirably very much thinner than the oxide film on the second dielectric layer.

Alternatively, the second B step may be followed by the second A step, and the first dielectric layer and the second dielectric layer may be formed respectively as the dielectric layer B and the dielectric layer A.

The first temperature TA1 and the second temperature TA2 preferably satisfy, for example, the relationships represented by Formulas (i) to (iii) below. Film formation through ALD and heat treatment using heat during the film formation can be performed at a temperature of 90° C. or higher and 400° C. or lower, and thus thermal damage to the metal foil can be suppressed.

$$\text{(i) } 0 \leq |TA1 - TA2| \leq 50$$

$$\text{(ii) } 90 \leq TA1 \leq 400$$

-continued (iii) $90 \leq TA2 \leq 400$

[System for Producing Electrode Foil for Electrolytic Capacitor]

A system for producing an electrode foil for an electrolytic capacitor according to an embodiment of the present disclosure includes: a film-forming portion that performs atomic layer deposition on a metal foil with a first main surface and a second main surface that is opposite to the first main surface, having a first porous portion on the first main surface side and a second porous portion on the second main surface side, thereby individually forming a first dielectric layer that covers a surface of the first porous portion and a second dielectric layer that covers a surface of the second porous portion. That is to say, in the film-forming portion, a second film-forming portion for forming a second dielectric layer that covers a surface of the second porous portion is provided separately from a first film-forming portion for forming a first dielectric layer that covers a surface of the first porous portion, that is, a second dielectric layer is not formed by the first film-forming portion, and a first dielectric layer is not formed by the second film-forming portion. With the film-forming portion, one of the first dielectric layer and the second dielectric layer can be formed as the dielectric layer A, and the other of the first dielectric layer and the second dielectric layer can be formed as the dielectric layer B.

The film-forming portion may include a plurality of first nozzles that face the first main surface and supply a first raw material gas to the first main surface, in a first film-forming region, and a plurality of second nozzles that face the second main surface and supply a second raw material gas to the second main surface, in a second film-forming region that is separate from the first film-forming region. In this case, the production system may include a first moving means for moving the plurality of first nozzles along the first main surface in the first film-forming region, and a second moving means for moving the plurality of second nozzles along the second main surface in the second film-forming region.

The first dielectric layer may be formed through film formation for a predetermined number of cycles by causing the first moving means to move the plurality of first nozzles (later-described nozzles a to d) in the first film-forming region with respect to the first main surface of the metal foil. The second dielectric layer may be formed through film formation for a predetermined number of cycles by causing the second moving means to move the plurality of second nozzles (later-described nozzles a to d) in the second film-forming region with respect to the second main surface of the metal foil.

The production system may include a conveying means for conveying the metal foil in the first film-forming region and the second film-forming region. In this case, the first moving means may move the plurality of first nozzles along a conveyance path of the metal foil in the first film-forming region, and the second moving means may move the plurality of second nozzles along the conveyance path of the metal foil in the second film-forming region. The film formation for a predetermined number of cycles may be performed by causing the moving means to move the plurality of nozzles while causing the conveying means to convey the metal foil. A conveyance roller may be used as the conveying means. In this case, a roll-to-roll system can be employed, which improves productivity.

The conveyance path of the metal foil may include, in each of the first film-forming region and the second film-forming region, a straight path and/or a curved path on which the metal foil is conveyed in a curved manner. In this case, the first moving means and the second moving means may respectively move the plurality of first nozzles and the plurality of second nozzles along the straight path and/or the curved path.

The first moving means may move the plurality of first nozzles in a direction that is the same as or opposite to a conveying direction of the metal foil, or reciprocally over the conveyance path, in the first film-forming region. The second moving means may move the plurality of second nozzles in a direction that is the same as or opposite to a conveying direction of the metal foil, or reciprocally over the conveyance path, in the second film-forming region.

If the conveyance path of the metal foil includes a curved path on which the metal foil is conveyed in a curved manner, it is desirable to form the dielectric layer B on the main surface that becomes convex when the metal foil is curved, and form the dielectric layer A on the main surface that becomes concave when the metal foil is curved. The formation of the dielectric layer B suppresses damage to the dielectric layer due to tensile stress.

Furthermore, the production system may include a conveyance roller that conveys the metal foil in the first film-forming region and the second film-forming region that is separate from the first film-forming region. In this case, the film-forming portion may include a first film-forming device that supplies a first raw material gas to the first main surface in the first film-forming region, and a second film-forming device that supplies a second raw material gas to the second main surface in the second film-forming region. The film-forming devices may include a moving means, and may be configured to be movable by the moving means.

More specifically, the film-forming portion may include a plurality of nozzles in each of the first film-forming region (the first film-forming device) and the second film-forming region (the second film-forming device). The plurality of nozzles include nozzles a that supply raw material gas to the main surface (the porous portion) of the metal foil, nozzles b that exhaust the raw material gas from the main surface (the porous portion) of the metal foil, nozzles c that supply an oxidant (or plasma gas) to the main surface (the porous portion) of the metal foil, and nozzles d that exhaust the oxidant (or plasma gas) from the main surface (the porous portion) of the metal foil. The first nozzles and the second nozzles described above are the nozzles a.

The plurality of nozzles are repeatedly arranged in the order of nozzles a through d in the length direction of an elongated metal foil (conveying direction of the metal foil). The nozzles have openings with a width dimension corresponding to the width direction of the elongated metal foil. The distance between the openings of the nozzles and the main surface of the metal foil facing the openings of the nozzles is very short, and thus the supply or exhaust of the raw material gas (oxidant or plasma gas) is efficiently performed in the region facing the openings of the nozzles. The nozzles a to d are moved sequentially over any point on the main surface of the metal foil through the movement or the reciprocal motion of the plurality of nozzles (the film-forming devices) in the film-forming regions to perform film formation.

The film formation may be performed first in the first film-forming region and then in the second film-forming region. In this case, heat during the film formation on the first main surface by the first film-forming device (the plurality of nozzles in the first film-forming region) can be used for heat treatment on the second main surface. That is to say, the first film-forming device (the plurality of nozzles in the first film-forming region) also serves as a first heat treatment device that performs heat treatment on the second main surface, in the first film-forming region. Through the heat treatment, an oxide film of a metal portion (an oxide of the first metal contained in the metal portion) constituting the second porous portion can be formed on the surface of the second porous portion on the second main surface side. In this case, the second film-forming device (the plurality of nozzles in the second film-forming region) forms a second dielectric layer on the surface of the second porous portion such that the oxide film with excellent adhesiveness to the metal portion is interposed therebetween. In this case, the peeling of the second dielectric layer from the surface of the second porous portion is suppressed. While the formation of the oxide film can reduce leakage current, the capacitance on the second main surface side tends to decrease. Thus, the second dielectric layer can be obtained as the dielectric layer B with excellent resistance to tensile stress on the second main surface side.

Furthermore, if the film formation is performed first in the first film-forming region and then in the second film-forming region, heat during the film formation on the second main surface by the second film-forming device (the plurality of nozzles in the second film-forming region) can be used for heat treatment on the first main surface. That is to say, the second film-forming device (the plurality of nozzles in the second film-forming region) also serves as a second heat treatment device that performs heat treatment on the first main surface having the first dielectric layer, in the second film-forming region. Through the heat treatment, the crystallinity of the first dielectric layer can be enhanced. Thus, the first dielectric layer can be obtained as the dielectric layer A that is advantageous for higher capacitance on the first main surface side. While the first dielectric layer serving as the dielectric layer A is more advantageous for higher capacitance than the second dielectric layer serving as the dielectric layer B, it tends to be brittle and its adhesiveness to the porous portion tends to be low.

If the second film-forming device (the plurality of nozzles in the second film-forming region) also serves as the second heat treatment device, heat during the film formation on the second main surface is conducted to the first main surface via the core portion, and the conducted heat can be used to perform heat treatment on the first main surface. If f the heat conducted to the first main surface is insufficient due to heat dissipation or thermal conductivity, a means for heating the first main surface from the first main surface side may be provided in addition to the heat source during the film formation on the second main surface. Furthermore, it is preferable to provide a means for measuring the temperature of the first main surface. It is further preferable to provide a means for controlling the temperature of the first main surface after the temperature of the first main surface is measured by the means for measuring the temperature of the first main surface and feedback is provided to the means for heating the first main surface.

The first temperature TA1 during film formation by the first film-forming device (the plurality of nozzles in the first film-forming region) (or during heat treatment by the same device serving as the first heat treatment device) may be the same as or different from the second temperature TA2 during film formation by the second film-forming device (the plurality of nozzles in the second film-forming region) (or during heat treatment by the same device serving as the second heat treatment device). TA1 and TA2 preferably satisfy, for example, the relationships represented by Formulas (i) to (iii) above.

A number X1 of the first nozzles may be the same as or different from a number X2 of the second nozzles. If the first dielectric layer is formed as the dielectric layer A, the number X1 of the first nozzles may be smaller than the number X2 of the second nozzles.

A number N1 of cycles in film formation by the first film-forming device (the plurality of nozzles in the first film-forming region) may be the same as or different from a number N2 of cycles in film formation by the second film-forming device (the plurality of nozzles in the second film-forming region). If the first dielectric layer is formed as the dielectric layer A, the number N1 of cycles may be smaller than the number N2 of cycles. The smaller the number of cycles in film formation, the smaller the thickness of the dielectric layer A, which is advantageous for higher capacitance.

The metal M1 contained in the first raw material gas may be the same as or different from the metal M2 contained in the second raw material gas. The metal M1 and the metal M2 may be a second metal that is different from the first metal contained in the metal portion constituting the porous portions. From the viewpoint of higher capacitance, if the first metal is Al, the second metal may be at least one selected from the group consisting of Ti, Si, Hf, and Nb.

The conveyance roller may convey the metal foil in the order of the first film-forming region and the second film-forming region or in the order of the second film-forming region and the first film-forming region.

FIG. 2 is a configuration diagram showing an example of the system for producing an electrode foil for an electrolytic capacitor according to an embodiment of the present disclosure.

A production system 400 includes rollers 410a to 410c that convey the metal foil 300 from a first film-forming region 430a to a second film-forming region 430b that is separate from the first film-forming region 430a.

Furthermore, the production system 400 includes a film-forming portion. The film-forming portion includes a first film-forming device 420a that supplies the first raw material gas to the first main surface S1 of the metal foil 300 while moving back and forth in the first film-forming region 430a, and a second film-forming device 420b that supplies the second raw material gas to the second main surface S2 of the metal foil 300 while moving back and forth in the second film-forming region 430b.

Hereinafter, a film forming step (a second step) by the production system 400 shown in FIG. 2 will be described in detail.

The rollers convey the metal foil 300 to the first film-forming region 430a. While a given point P1 on the metal foil 300 passes through the first film-forming region 430a (the conveyance path of the metal foil 300 with a distance L1 in the first film-forming region 430a), the first film-forming device 420a moves back and forth in the first film-forming region 430a. That is to say, the first film-forming device 420a reciprocally moves over the distance L1 along the conveyance path of the metal foil 300 in the first film-forming region 430a. The first film-forming device 420a performs film formation for the number N1 of cycles on the first main surface S1 at the given point P1 on the metal foil 300, while moving reciprocally. The first film-forming device 420a may perform film formation in both of the forward and backward paths or in one of the forward and the backward paths according to a desired number N1 of cycles.

The first film-forming device 420a includes a plurality of first nozzles that supply the first raw material gas to the first main surface S1. The film formation for the number N1 of cycles is typically performed such that a velocity V2a at which the first nozzles move along the conveyance path in accordance with the reciprocal motion of the first film-forming device 420a is larger than a velocity V1a at which the given point P1 on the metal foil 300 moves along the conveyance path. V1a and V2a may be set as appropriate according to a desired number N1 of cycles and the number X1 of the first nozzles. If the number of cycles is 50 or more, V2a/V1a≥2 is preferable. From the viewpoint of productivity, V2a/V1a≥5 is preferable.

After the first film-forming device 420a performs film formation on the first main surface S1, the rollers convey the metal foil 300 to the second film-forming region 430b. While a given point P2 on the second main surface S2 of the metal foil 300 passes through the second film-forming region 430b (the conveyance path of the metal foil 300 with a distance L2 in the second film-forming region 430b), the second film-forming device 420b moves back and forth in the second film-forming region 430b. That is to say, the second film-forming device 420b reciprocally moves over the distance L2 along the conveyance path of the metal foil 300 in the second film-forming region 430b. The second film-forming device 420b performs film formation for the number N2 of cycles on the second main surface S2 at the given point P2 on the second main surface S2 of the metal foil 300, while moving reciprocally. The second film-forming device 420b may perform film formation in both of the forward and backward paths or in one of the forward and the backward paths according to a desired number N2 of cycles.

The second film-forming device 420b includes a plurality of second nozzles that supply the second raw material gas to the second main surface S2. The film formation for the number N2 of cycle is typically performed such that a velocity V2b at which the second nozzles move along the conveyance path in accordance with the reciprocal motion of the second film-forming device 420b is larger than a velocity V1b at which the given point P2 on the metal foil 300 moves along the conveyance path. V1b and V2b may be set as appropriate according to a desired number N2 of cycles and the number X2 of the second nozzles. If the number of cycles is 50 or more, V2b/V1b≥2 is preferable. From the viewpoint of productivity, V2b/V1b≥5 is preferable.

More specifically, the film-forming device 420a (420b) includes the above-described nozzles a to d. In the case of the production system shown in FIG. 2, while a given point on a main surface of the metal foil moves through the film-forming region, film formation is performed by sequentially moving the nozzles a to d over the given point P on the main surface of the metal foil through the back-and-forth movement (reciprocal motion) of the film-forming device.

Figure 3:
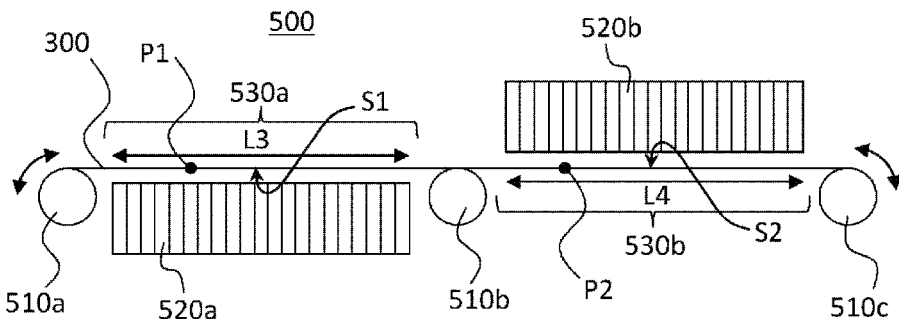
FIG. 3 is a configuration diagram showing another example of the system for producing an electrode foil for an electrolytic capacitor according to an embodiment of the present disclosure.

FIG. 3 is a configuration diagram showing another example of the system for producing an electrode foil for an electrolytic capacitor according to an embodiment of the present disclosure.

A production system 500 includes rollers 510a to 510c that convey the metal foil 300 from a first film-forming region 530a to a second film-forming region 530b that is separate from the first film-forming region 530a, and reciprocally move the metal foil 300 in each of the first film-forming region 530a and the second film-forming region 530b.

Furthermore, the production system 500 includes a film-forming portion. The film-forming portion includes a first film-forming device 520a that supplies the first raw material gas to the first main surface S1 of the metal foil 300 in the first film-forming region 530a, and a second film-forming device 520b that supplies the second raw material gas to the second main surface S2 of the metal foil 300 in the second film-forming region 530b. The first film-forming device 520a includes a plurality of first nozzles that supply the first raw material gas to the first main surface S1. The second film-forming device 520b includes a plurality of second nozzles that supply the second raw material gas to the second main surface S2.

Hereinafter, a film forming step (a second step) by the production system 500 shown in FIG. 3 will be described in detail.

The rollers 510a to 510c convey the metal foil 300 to the first film-forming region 530a, and the given point P1 on the metal foil 300 reciprocally moves over the conveyance path with a distance L3 in the first film-forming region 530a. During that time, the first film-forming device 520a performs film formation for the number N1 of cycles on the first main surface S1 at the given point P1 on the metal foil 300.

After the first film-forming device 520a performs film formation on the first main surface S1, the rollers 510a to 510c convey the metal foil 300 to the second film-forming region 530b, and the given point P2 on the metal foil 300 reciprocally moves over the conveyance path with a distance L4 in the second film-forming region 530b. During that time, the second film-forming device 520b performs film formation for the number N2 of cycles on the second main surface S2 at the given point P2 on the metal foil 300. More specifically, the film-forming device 520a (520b) includes the above-described nozzles a to d. In the case of the production system shown in FIG. 3, film formation is performed by sequentially moving a given point P on a main surface of the metal foil to positions so as to face the nozzles a to d through the reciprocal motion of the metal foil in the film-forming region.

In the production system shown in FIG. 2, the stress on the metal foil and the rollers is smaller than in the production system shown in FIG. 3. However, if the desired number N1 (N2) of cycles is large, it is necessary to increase the number X1 (X2) of nozzles of the film-forming device 420a (420b), increase the movement distance L1 (L2), or increase V2a/V1a (V2b/V1b). Accordingly, the devices may become larger and the device cost may increase. On the other hand, in the production system shown in FIG. 3, the film-forming devices are fixed and thus the device cost can be accordingly smaller than in the production system shown in FIG. 2. However, since the metal foil is reciprocally moved by the rollers, the stress on the metal foil may increase. The stress on the rollers may also increase because the direction of rotation of the rollers has to be changed to reciprocally move the metal foil. The production system in FIG. 2 can be combined with the production system in FIG. 3, and the combination may be more effective in some cases.

Hereinafter, matters common to the production system 400 in FIG. 2 and the production system 500 in FIG. 3 will be described.

The first film-forming device 420a (520a) is disposed on the first main surface S1 side of the metal foil 300 that is conveyed by the rollers, in the first film-forming region 430a (530a). The second film-forming device 420b (520b) is disposed on the second main surface S2 side of the metal foil 300 that is conveyed by the rollers, in the second film-forming region 430b (530b).

Since the first film-forming region 430a (530a) is separate from the second film-forming region 430b (530b), the first film-forming device 420a (520a) is separate from the second film-forming device 420b (520b). Thus, in the first film-forming region 430a (530a), the second raw material gas is not supplied by the second film-forming device 420b (520b) to the first main surface S1 and the second main surface S2 of the metal foil 300. In the second film-forming region 430b (530b), the first raw material gas is not supplied by the first film-forming device 420a (520a) to the first main surface S1 and the second main surface S2 of the metal foil 300.

In the first film-forming region 430a (530a), the first film-forming device 420a (520a) supplies the first raw material gas to the first main surface S1 of the metal foil 300, and does not supply the first raw material gas to the second main surface S2 of the metal foil 300. In the second film-forming region 430b (530b), the second film-forming device 420b (520b) supplies the second raw material gas to the second main surface S2 of the metal foil 300, and does not supply the second raw material gas to the first main surface S1 of the metal foil 300.

The conveyance rollers 410a to 410c (510a to 510c) shown in FIG. 2 (FIG. 3) convey the metal foil 300 in the order of the first film-forming region 430a (530a) and the second film-forming region 430b (530b).

The first film-forming device 420a (520a) can also serve as a first heat treatment device that performs heat treatment on the second main surface S2, in the first film-forming region 430a (530a). Through the heat treatment, an oxide film of a metal portion (an oxide of the first metal contained in the metal portion) constituting the second porous portion can be formed on the surface of the second porous portion on the second main surface S2 side. In this case, the second film-forming device 420b (520b) forms a second dielectric layer on the surface of the second porous portion such that the oxide film with excellent adhesiveness to the metal portion is interposed therebetween. In this case, the peeling of the second dielectric layer from the surface of the second porous portion is suppressed. While the formation of the oxide film can reduce leakage current, the capacitance on the second main surface side tends to decrease. Thus, the second dielectric layer can be obtained as the dielectric layer B with excellent resistance to tensile stress on the second main surface side.

Furthermore, the second film-forming device 420b (520b) can also serve as a second heat treatment device that performs heat treatment on the first main surface S1 having the first dielectric layer, in the second film-forming region 430b (530b). Through the heat treatment, the crystallinity of the first dielectric layer can be enhanced. Thus, the first dielectric layer can be obtained as the dielectric layer A that is advantageous for higher capacitance on the first main surface side. While the first dielectric layer serving as the dielectric layer A is more advantageous for higher capacitance than the second dielectric layer serving as the dielectric layer B, it tends to be brittle and its adhesiveness to the porous portion tends to be low.

The first temperature TA1 during film formation by the first film-forming device 420a (520a) (or during heat treatment by the same device serving as the first heat treatment device) may be the same as or different from the second temperature TA2 during film formation by the second film-forming device 420b (520b) (or during heat treatment by the same device serving as the second heat treatment device). TA1 and TA2 preferably satisfy, for example, the relationships represented by Formulas (i) to (iii) above. The number X1 of the first nozzles may be the same as or different from the number X2 of the second nozzles. From the viewpoint of forming the first dielectric layer as the dielectric layer A, the number X1 of the first nozzles may be smaller than the number X2 of the second nozzles.

The number N1 of cycles in film formation by the first film-forming device 420a (520a) may be the same as or different from the number N2 of cycles in film formation by the second film-forming device 420b (520b). From the viewpoint of forming the first dielectric layer as the dielectric layer A, the number N1 of cycles may be smaller than the number N2 of cycles. The smaller the number of cycles in film formation, the smaller the thickness of the dielectric layer A, which is advantageous for higher capacitance.

In the production system 400 (500), the metal foil 300 may be curved by the roller 410c (510a, 510c) during film formation. Since the metal foil 300 is curved such that the second main surface S2 on which the second dielectric layer is formed as the dielectric layer B becomes convex and the first main surface S1 on which the first dielectric layer is formed as the dielectric layer A becomes concave, damage to the dielectric layers due to tensile stress is suppressed.

In the production system 400 (500), the metal foil 300 is conveyed in the order of the first film-forming region and the second film-forming region, but may be conveyed in the order of the second film-forming region and the first film-forming region. The first dielectric layer and the second dielectric layer may be formed respectively as the dielectric layer B and the dielectric layer A.

In the above-described production method (or the above-described production system), the first dielectric layer and the second dielectric layer may be respectively formed as the dielectric layer A and the dielectric layer B in the second step (or by the film-forming portion). In this case, the first dielectric layer and the second dielectric layer can be formed such that the thickness F1 of the first dielectric layer and the thickness F2 of the second dielectric layer satisfy the relationship represented by Formula (1) below.

$$0.75 \le F1/F2 \le 0.97 \tag{1}$$

Alternatively, in the above-described case, the first dielectric layer and the second dielectric layer can be formed such that the capacitance C1 that appears on the first main surface side having the first dielectric layer and the capacitance C2 that appears on the second main surface side having the second dielectric layer satisfy the relationship represented by Formula (2) below.

$$0.80 \le C2/C1 \le 0.99 \tag{2}$$

[Electrode Foil for Electrolytic Capacitor]

An electrode foil for an electrolytic capacitor includes: a metal foil with a first main surface and a second main surface that is opposite to the first main surface, having a first porous portion on the first main surface side and a second porous portion on the second main surface side; a first dielectric layer that covers a surface of the first porous portion; and a second dielectric layer that covers a surface of the second porous portion.

In the electrode foil for an electrolytic capacitor according to an embodiment of the present disclosure (hereinafter, also referred to as a "first electrode foil"), the thickness F1 of the first dielectric layer and the thickness F2 of the second dielectric layer satisfy the relationship represented by Formula (1) above. That is to say, F1/F2 is 0.75 or more and 0.97 or less. F1/F2 may be 0.85 or more and 0.95 or less.

Note that the thickness F1, F2 of the dielectric layer refers to the thickness of the dielectric layer that covers the outer surface of the porous portion (the metal foil). The thickness F1, F2 of the dielectric layer can be determined by measuring the thicknesses of the dielectric layer at any 10 points using a SEM or TEM cross-sectional image of the electrode foil in the thickness direction and averaging them.

Furthermore, in the electrode foil for an electrolytic capacitor according to another embodiment of the present disclosure (hereinafter, also referred to as a "second electrode foil"), the capacitance C1 that appears on the first main surface side having the first dielectric layer and the capacitance C2 that appears on the second main surface side having the second dielectric layer satisfy the relationship represented by Formula (2) above. That is to say, C2/C1 is 0.8 or more and 0.99 or less. C2/C1 may be 0.8 or more and 0.97 or less, or 0.8 or more and 0.95 or less.

Note that the capacitance C1, C2 can be determined by sealing (or coating) one of the first main surface and the second main surface of the electrode foil, and measuring the other unsealed main surface in an electrolyte solution.

The above-described electrode foil can be obtained by individually forming the first dielectric layer and the second dielectric layer respectively as the dielectric layer A and the dielectric layer B using the above-described production method (the production system).

It is also possible that the metal foil of the first electrode foil or the second electrode foil has an anode extraction portion and a cathode forming portion, and, in the cathode forming portion, the surface of the first porous portion and the surface of the second porous portion are respectively covered with the first dielectric layer and the second dielectric layer. Hereinafter, such an electrode foil is also referred to as a "third electrode foil".

[Electrolytic Capacitor]

An electrolytic capacitor according to an embodiment of the present disclosure includes: a wound body; and an electrolyte, wherein the wound body is obtained by winding together an anode foil, a cathode foil, and a separator that is interposed between the anode foil and the cathode foil. The anode foil is the above-described first electrode foil or second electrode foil. If the first electrode foil or the second electrode foil is used, it is possible to obtain an electrolytic capacitor with high capacitance and high reliability.

The wound body is obtained by winding together a strip-shaped anode foil and a strip-shaped cathode foil in the form of a cylinder around a winding core with a separator interposed between the foils. In the wound body, the first electrode foil or the second electrode foil is preferably disposed such that the first main surface (the main surface on the side of the first dielectric layer formed as the dielectric layer A) faces toward the axial center of the wound body (winding core side).

The electrolytic capacitor may further include a lead member that is connected to the anode foil. In this case, the anode foil and the lead member are preferably connected by a swaging portion in an overlap portion in which the second main surface of the anode foil and the lead member overlap each other. In the overlap portion (the swaging portion), the lead member is preferably disposed on the second main surface of the anode foil. When swaging the lead member to the anode foil, tensile stress is likely to be generated on a main surface of the anode foil overlapping the lead member. Thus, it is desirable that the second main surface having the second dielectric layer formed as the dielectric layer B overlaps the lead member, from the viewpoint of suppressing damage to the dielectric layer. This configuration is desirable also from the viewpoint of reducing contact resistance, since cracking starting from the damaged point of the dielectric layer is suppressed.

The swaging portion is formed as follows. The lead member is placed so as to overlap a main surface of the anode foil, and a hole is formed though a predetermined position of the overlapping portion from the lead member side using a needle-shaped member. At this time, a portion of the lead member is extracted to the other surface of the anode foil. The extracted portion is caused to adhere to the other main surface of the anode foil.

(Cathode Foil)

A metal foil containing a valve action metal such as Al, Ta, or Nb can be used as the cathode foil. A surface of the metal foil may be roughened through etching as necessary. That is to say, the cathode foil may be a metal foil including a porous portion and a core portion that is continuous with the porous portion.

(Separator)

A separator 30 is not particularly limited, and may be, for example, nonwoven cloth containing fibers made of cellulose, polyethylene terephthalate, vinylon, or polyamide (e.g., aliphatic polyamide or aromatic polyamide such as aramid).

(Electrolyte)

The electrolyte contains at least one of a solid electrolyte and an electrolyte solution. The cathode portion may contain a solid electrolyte and an electrolyte solution, or a solid electrolyte and a nonaqueous solvent. Hereinafter, the electrolyte solution and the nonaqueous solvent may be collectively referred to as a "liquid component". Coating of the dielectric layer with the solid electrolyte (or the electrolyte solution) is performed, for example, by impregnating the electrode foil (or the wound body) with a treatment solution containing a conductive polymer (or the electrolyte solution). The treatment solution may contain a nonaqueous solvent.

The solid electrolyte contains a conductive polymer. The conductive polymer is a $\pi$-conjugated polymer, for example. Examples of the conductive polymer include polypyrrole, polythiophene, polyfuran, and polyaniline. It is possible to use one type of conductive polymer alone, two or more types of conductive polymers in combination, or a copolymer of two or more monomers. The conductive polymer has a weight-average molecular weight of 1000 to 100000, for example.

Note that polypyrrole, polythiophene, polyfuran, polyaniline, and the like referred to in the present specification respectively mean polymers that include polypyrrole, polythiophene, polyfuran, polyaniline, and the like as the basic structure. Accordingly, the terms polypyrrole, polythiophene, polyfuran, polyaniline, and the like also encompass derivatives of those polymers. For example, the term polythiophene encompasses poly(3,4-ethylenedioxythiophene), for example.

The conductive polymer can be doped with a dopant. The solid electrolyte may contain a dopant together with the conductive polymer. Examples of the dopant include polystyrene sulfonic acid. The solid electrolyte may further contain an additive as necessary.

The liquid component is in contact with the dielectric layer directly or via the conductive polymer. The liquid component may be a nonaqueous solvent or an electrolyte solution. The electrolyte solution contains a nonaqueous solvent and an ionic material (a solute (e.g., an organic salt))

dissolved in the nonaqueous solvent. The nonaqueous solvent may be an organic solvent or an ionic liquid.

A solvent that has a high boiling point is preferably used as the nonaqueous solvent. For example, it is possible to use polyol compounds such as ethylene glycol, sulfone compounds such as sulfolane, lactone compounds such as γ-butyrolactone, ester compounds such as methyl acetate, carbonate compounds such as propylene carbonate, ether compounds such as 1,4-dioxane, and ketone compounds such as methylethylketone.

The liquid component may contain an acid component (anion) and a base component (cation). A salt (solute) may be constituted of the acid component and the base component. The acid component contributes to a coating film repair function. Examples of the acid component include organic carboxylic acids and inorganic acids. Examples of inorganic acids include phosphoric acid, boric acid, and sulfuric acid. Examples of the base component include primary to tertiary amine compounds.

An organic salt is a salt in which at least one of the anion and the cation includes an organic substance. Examples of organic salts that can be used include trimethylamine maleate, triethylamine borodisalicylate, ethyldimethylamine phthalate, mono-1,2,3,4-tetramethylimidazolinium phthalate, and mono-1,3-dimethyl-2-ethylimidazolinium phthalate.

From the viewpoint of suppressing de-doping of the dopant from the conductive polymer (deterioration of the solid electrolyte), the liquid component preferably contains the acid component more than the base component. Also, the acid component contributes to the coating film repair function of the liquid component, and therefore, the liquid component preferably contains the acid component more than the base component. The molar ratio (acid component/base component) of the acid component to the base component is 1.1 or more, for example. From the viewpoint of suppressing de-doping of the dopant from the conductive polymer, for example, pH of the liquid component may be 6 or less, or 1 or more and 5 or less.

Figure 4:
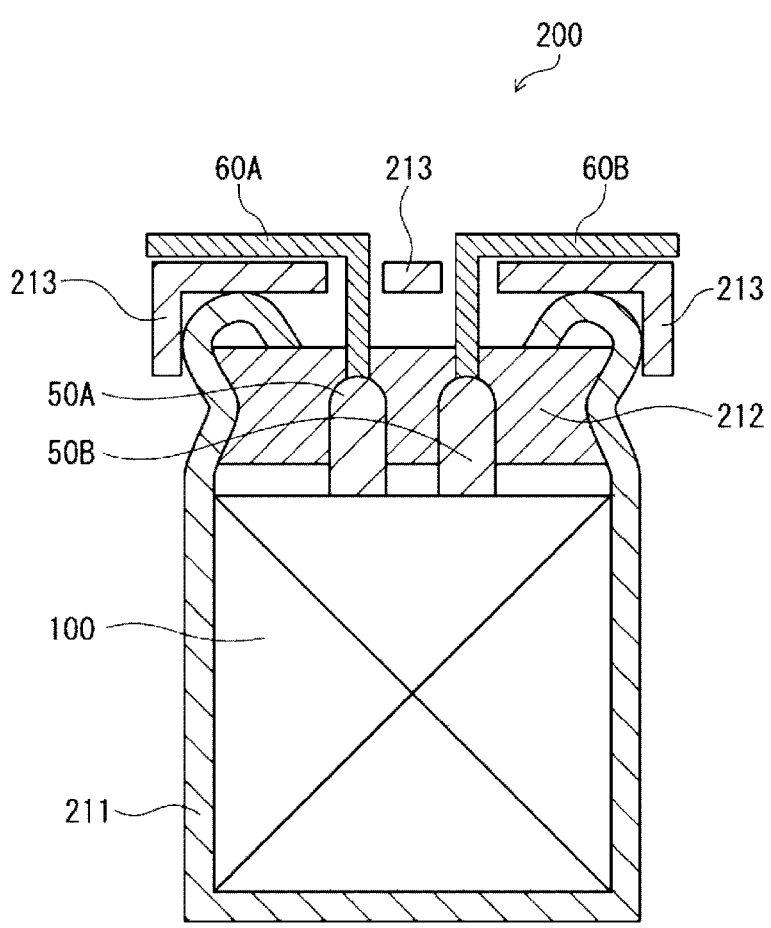
FIG. 4 is a cross-sectional schematic diagram of an electrolytic capacitor according to an embodiment of the present disclosure.
Figure 5:
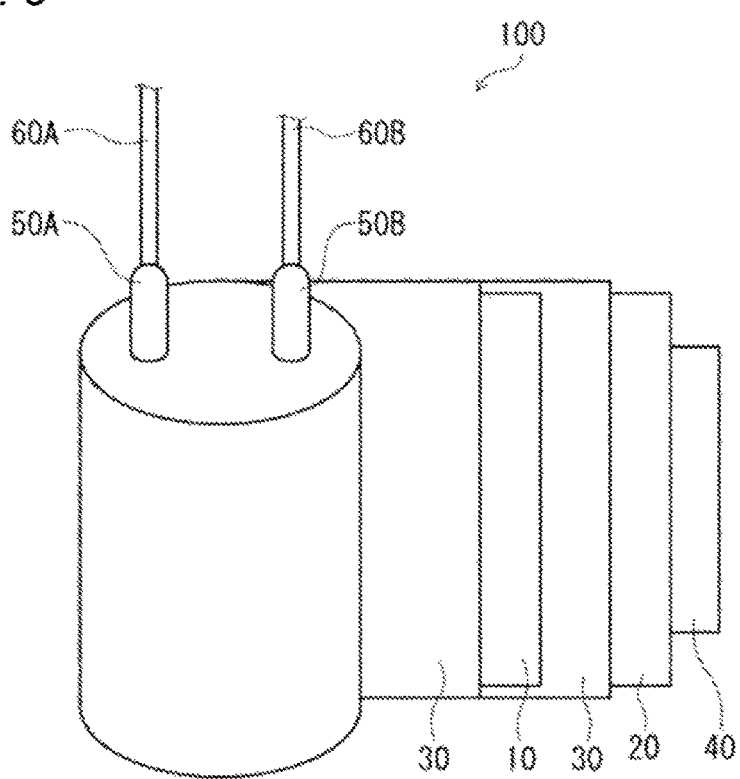
FIG. 5 is a perspective view schematically showing the configuration of a wound body of FIG. 4.

FIG. 4 is a cross-sectional view schematically showing the electrolytic capacitor according to an embodiment of the present disclosure. FIG. 4 shows an example of an electrolytic capacitor including a wound-type capacitor element. FIG. 5 is a perspective view schematically showing the configuration of a wound body of FIG. 4.

An electrolytic capacitor 200 includes a wound body 100. The wound body 100 is obtained by winding together the anode foil 10 and the cathode foil 20 with the separator 30 interposed therebetween.

End portions of lead tabs 50A and 50B are respectively connected to the anode foil 10 and the cathode foil 20, and the wound body 100 is obtained by winding the electrode foils to which the lead tabs 50A and 50B are connected. Lead wires 60A and 60B are respectively connected to other end portions of the lead tabs 50A and 50B.

A winding end tape 40 is provided on the outer surface of a portion of the cathode foil 20 constituting the outermost layer of the wound body 100, and an end portion of the cathode foil 20 is fixed with the winding end tape 40. If the anode foil 10 is prepared by cutting a large foil, chemical conversion treatment may be further performed on the wound body 100 to provide a dielectric layer on the cut cross section.

The wound body 100 contains an electrolyte between the anode foil 10 (dielectric layer) and the cathode foil 20. The wound body 100 containing the electrolyte is obtained by impregnating the wound body 100 with a treatment solution containing a conductive polymer (or the electrolyte solution), for example. The impregnation may be carried out in an atmosphere having a reduced pressure of 10 to 100 kPa, for example.

The wound body 100 is housed in a bottomed case 211 such that the lead wires 60A and 60B are located on the opening side of the bottomed case 211. The bottomed case 211 may be made of metal such as aluminum, stainless steel, copper, iron, or brass, or an alloy of any of these metals.

A sealing member 212 is arranged in the opening of the bottomed case 211 in which the wound body 100 is housed, the open end of the bottomed case 211 is swaged on the sealing member 212 to be curled, and a base plate 213 is arranged on the curled portion to seal the wound body 100 in the bottomed case 211.

The sealing member 212 is formed such that the lead wires 60A and 60B extend therethrough. The sealing member 212 is only required to be made of an insulating material, and is preferably constituted of an elastic member. In particular, it is preferable to use silicone rubber, fluororubber, ethylene propylene rubber, Hypalon rubber, butyl rubber, isoprene rubber, or the like, which has high heat resistance.

An electrolytic capacitor according to another embodiment of the present disclosure includes a stack in which a plurality of capacitor elements each including an anode body and a cathode portion are stacked, the anode body having an anode extraction portion and a cathode forming portion, and the cathode portion covering the cathode forming portion. The stack has an anode stacked portion in which a plurality of the anode extraction portions are stacked and a cathode stacked portion in which a plurality of the cathode forming portions each covered with the cathode portion are stacked. At least one of the anode bodies of the plurality of capacitor elements is the above-described third electrode foil. If the third electrode foil is used, it is possible to obtain an electrolytic capacitor with high capacitance and high reliability.

When a stack is formed, the thickness in the stacking direction of the cathode stacked portion tends to increase at the center portion of the surface that is perpendicular to the stacking direction of the cathode stacked portion, and the thickness in the stacking direction of the cathode stacked portion tends to decrease at the portion surrounding the center portion, causing the electrode foil to be curved. That is to say, in the electrode foil, the surface of the center side in the stacking direction of the stack is likely to have a concave shape. Thus, in the stack, the third electrode foil is preferably disposed such that the first main surface (the main surface on the side of the first dielectric layer formed as the dielectric layer A) faces toward the center of the stack in the stacking direction.

A stacked-type electrolytic capacitor includes, for example, the above-described stack, and a resin outer body that seals the stack. The cathode portion includes a solid electrolyte layer that covers at least part of the cathode forming portion, and a cathode extraction layer that covers at least part of the solid electrolyte layer. The cathode extraction layer includes, for example, a silver paste layer and a carbon layer. An anode lead is connected to the anode stacked portion. A cathode lead is connected to the cathode extraction layer at an end portion in the stacking direction of the stack. The anode lead and the cathode lead are partially exposed from the outer body.

INDUSTRIAL APPLICABILITY

An electrode foil for an electrolytic capacitor according to the present disclosure is suitably used for an electrolytic capacitor for which high capacitance and high reliability are required.

Although the presently preferred embodiments of the present disclosure have been described, such a disclosure is not to be interpreted as limiting. Various alterations and modifications will no doubt become apparent to those skilled in the art to which the present disclosure pertains, after having read the above disclosure. Accordingly, it is intended that the appended claims be interpreted as covering all alterations and modifications that fall within the true spirit and scope of the disclosure.

REFERENCE SIGNS LIST

10: anode foil, 20: cathode foil, 30: separator, 40: winding end tape, 60A, 60B: lead wire, 50A, 50B: lead tab, 100: wound body, 200: electrolytic capacitor, 211: bottomed case, 212: sealing member, 213: base plate, 300: metal foil, S1: first main surface, S2: second main surface, 310a: first porous portion, 310b: second porous portion, 320: core portion, 400, 500: system for producing electrode foil, 410a to 410c, 510a to 510c: roller, 420a, 520a: first film-forming device, 420b, 520b: second film-forming device, 430a, 530a: first film-forming region, 430b, 530b: second film-forming region

The invention claimed is:

1. An electrode foil for an electrolytic capacitor, comprising:
   a metal foil with a first main surface and a second main surface that is opposite to the first main surface, having a first porous portion on the first main surface side and a second porous portion on the second main surface side;
   a first dielectric layer that covers a surface of the first porous portion; and
   a second dielectric layer that covers a surface of the second porous portion,
   wherein a thickness F1 of the first dielectric layer and a thickness F2 of the second dielectric layer satisfy a relationship:

$$0.75 \le F1/F2 \le 0.97.$$

2. The electrode foil for an electrolytic capacitor according to claim 1,
   wherein the metal foil has an anode extraction portion and a cathode forming portion, and
   in the cathode forming portion, the surface of the first porous portion and the surface of the second porous portion are respectively covered with the first dielectric layer and the second dielectric layer.

3. An electrolytic capacitor comprising:
   a stack in which a plurality of capacitor elements each including an anode body and a cathode portion are stacked, the anode body having an anode extraction portion and a cathode forming portion, and the cathode portion covering the cathode forming portion,
   wherein the stack has an anode stacked portion in which a plurality of the anode extraction portions are stacked and a cathode stacked portion in which a plurality of the cathode forming portions each covered with the cathode portion are stacked, and
   at least one of the anode bodies of the plurality of capacitor elements is the electrode foil according to claim 2.

4. The electrolytic capacitor according to claim 3, wherein, in the stack, the electrode foil is disposed such that the first main surface faces toward a center of the stack in a stacking direction.

5. An electrolytic capacitor comprising:
   a wound body; and
   an electrolyte,
   wherein the wound body is obtained by winding together an anode foil, a cathode foil, and a separator that is interposed between the anode foil and the cathode foil, and
   the anode foil is the electrode foil according to claim 1.

6. The electrolytic capacitor according to claim 5, wherein, in the wound body, the electrode foil is disposed such that the first main surface faces toward an axial center of the wound body.

7. The electrolytic capacitor according to claim 5, further comprising:
   a lead member that is connected to the anode foil,
   wherein the anode foil and the lead member are connected by a swaging portion in an overlap portion in which the second main surface of the anode foil and the lead member overlap each other.

8. An electrode foil for an electrolytic capacitor, comprising:
   a metal foil with a first main surface and a second main surface that is opposite to the first main surface, having a first porous portion on the first main surface side and a second porous portion on the second main surface side;
   a first dielectric layer that covers a surface of the first porous portion; and
   a second dielectric layer that covers a surface of the second porous portion,
   wherein a capacitance C1 that appears on the first main surface side having the first dielectric layer and a capacitance C2 that appears on the second main surface side having the second dielectric layer satisfy a relationship:

$$0.80 \le C2/C1 \le 0.99.$$

9. The electrode foil for an electrolytic capacitor according to claim 8,
   wherein the metal foil has an anode extraction portion and a cathode forming portion, and
   in the cathode forming portion, the surface of the first porous portion and the surface of the second porous portion are respectively covered with the first dielectric layer and the second dielectric layer.

10. An electrolytic capacitor comprising:
   a stack in which a plurality of capacitor elements each including an anode body and a cathode portion are stacked, the anode body having an anode extraction portion and a cathode forming portion, and the cathode portion covering the cathode forming portion,
   wherein the stack has an anode stacked portion in which a plurality of the anode extraction portions are stacked and a cathode stacked portion in which a plurality of the cathode forming portions each covered with the cathode portion are stacked, and at least one of the anode bodies of the plurality of capacitor elements is the electrode foil according to claim 9.

11. The electrolytic capacitor according to claim 10, wherein, in the stack, the electrode foil is disposed such that the first main surface faces toward a center of the stack in a stacking direction.

12. An electrolytic capacitor comprising:

a wound body; and an electrolyte, wherein the wound body is obtained by winding together an anode foil, a cathode foil, and a separator that is interposed between the anode foil and the cathode foil, and the anode foil is the electrode foil according to claim 8.

13. The electrolytic capacitor according to claim 12, wherein, in the wound body, the electrode foil is disposed such that the first main surface faces toward an axial center of the wound body.

14. The electrolytic capacitor according to claim 12, further comprising:

a lead member that is connected to the anode foil, wherein the anode foil and the lead member are connected by a swaging portion in an overlap portion in which the second main surface of the anode foil and the lead member overlap each other.

15. A method for producing an electrode foil for an electrolytic capacitor, comprising:

a first step of preparing a metal foil with a first main surface and a second main surface that is opposite to the first main surface, having a first porous portion on the first main surface side and a second porous portion on the second main surface side; and a second step of individually forming a first dielectric layer that covers a surface of the first porous portion and a second dielectric layer that covers a surface of the second porous portion, wherein the second step includes:

a second A step of forming the first dielectric layer at a first temperature TA1° C. through atomic layer deposition; and a second B step of forming the second dielectric layer at a second temperature TA2° C. through atomic layer deposition.

16. A method for producing an electrode foil for an electrolytic capacitor, comprising:

a first step of preparing a metal foil with a first main surface and a second main surface that is opposite to the first main surface, having a first porous portion on the first main surface side and a second porous portion on the second main surface side; and a second step of individually forming a first dielectric layer that covers a surface of the first porous portion and a second dielectric layer that covers a surface of the second porous portion, wherein the second step includes:

a second A step of forming the first dielectric layer at a first temperature TA1° C. through atomic layer deposition; and a second B step of forming the second dielectric layer at a second temperature TA2° C. through atomic layer deposition, wherein the second A step is followed by the second B step, and the second B step also serves as a step of performing heat treatment on the first main surface having the first dielectric layer at the second temperature TA2 to increase a crystallinity of the first dielectric layer.

17. A method for producing an electrode foil for an electrolytic capacitor, comprising:

a first step of preparing a metal foil with a first main surface and a second main surface that is opposite to the first main surface, having a first porous portion on the first main surface side and a second porous portion on the second main surface side; and a second step of individually forming a first dielectric layer that covers a surface of the first porous portion and a second dielectric layer that covers a surface of the second porous portion, wherein the second step includes:

a second A step of forming the first dielectric layer at a first temperature TA1° C. through atomic layer deposition; and a second B step of forming the second dielectric layer at a second temperature TA2° C. through atomic layer deposition, wherein the second A step is followed by the second B step, and the second B step also serves as a step of performing heat treatment on the first main surface having the first dielectric layer at the second temperature TA2 to increase a crystallinity of the first dielectric layer, wherein the second A step also serves as a step of performing heat treatment on the second main surface at the first temperature TA1 to form an oxide film of a metal portion constituting the second porous portion on the surface of the second porous portion, and in the second B step, the second dielectric layer is formed on the surface of the second porous portion with the oxide film interposed therebetween.

18. A method for producing an electrode foil for an electrolytic capacitor, comprising:

a first step of preparing a metal foil with a first main surface and a second main surface that is opposite to the first main surface, having a first porous portion on the first main surface side and a second porous portion on the second main surface side; and a second step of individually forming a first dielectric layer that covers a surface of the first porous portion and a second dielectric layer that covers a surface of the second porous portion, wherein the second step includes:

a second A step of forming the first dielectric layer at a first temperature TA1° C. through atomic layer deposition; and a second B step of forming the second dielectric layer at a second temperature TA2° C. through atomic layer deposition, wherein the first temperature TA1 and the second temperature TA2 satisfy relationships:

$$0 \leq |TA1 - TA2| \leq 50;$$

$$90 \leq TA1 \leq 400; \text{ and}$$

$$90 \leq TA2 \leq 400.$$

19. A method for producing an electrode foil for an electrolytic capacitor, comprising:

a first step of preparing a metal foil with a first main surface and a second main surface that is opposite to the first main surface, having a first porous portion on the first main surface side and a second porous portion on the second main surface side; and a second step of individually forming a first dielectric layer that covers a surface of the first porous portion and a second dielectric layer that covers a surface of the second porous portion, wherein a thickness F1 of the first dielectric layer and a thickness F2 of the second dielectric layer satisfy a relationship:

$$0.75 \le F1/F2 \le 0.97.$$

20. A method for producing an electrode foil for an electrolytic capacitor, comprising:

a first step of preparing a metal foil with a first main surface and a second main surface that is opposite to the first main surface, having a first porous portion on the first main surface side and a second porous portion on the second main surface side; and a second step of individually forming a first dielectric layer that covers a surface of the first porous portion and a second dielectric layer that covers a surface of the second porous portion, wherein a capacitance C1 that appears on the first main surface side having the first dielectric layer and a capacitance C2 that appears on the second main surface side having the second dielectric layer satisfy a relationship:

$$0.80 \le C2/C1 \le 0.99.$$

21. A system for producing an electrode foil for an electrolytic capacitor, comprising:

a film-forming portion that performs atomic layer deposition on a metal foil with a first main surface and a second main surface that is opposite to the first main surface, having a first porous portion on the first main surface side and a second porous portion on the second main surface side, thereby individually forming a first dielectric layer that covers a surface of the first porous portion and a second dielectric layer that covers a surface of the second porous portion.

22. The system for producing an electrode foil for an electrolytic capacitor according to claim 21, wherein the film-forming portion includes:

a plurality of first nozzles that face the first main surface and supply a first raw material gas to the first main surface, in a first film-forming region; and a plurality of second nozzles that face the second main surface and supply a second raw material gas to the second main surface, in a second film-forming region that is separate from the first film-forming region, wherein the system for producing an electrode foil for an electrolytic capacitor further comprises:

a first moving means for moving the plurality of first nozzles along the first main surface in the first film-forming region; and a second moving means for moving the plurality of second nozzles along the second main surface in the second film-forming region.

23. The system for producing an electrode foil for an electrolytic capacitor according to claim 22, further comprising:

a conveying means for conveying the metal foil in the first film-forming region and the second film-forming region, wherein the first moving means moves the plurality of first nozzles along a conveyance path of the metal foil in the first film-forming region, and the second moving means moves the plurality of second nozzles along the conveyance path of the metal foil in the second film-forming region.

24. The system for producing an electrode foil for an electrolytic capacitor according to claim 23, wherein the conveyance path of the metal foil includes, in each of the first film-forming region and the second film-forming region, a straight path and/or a curved path on which the metal foil is conveyed in a curved manner, and the first moving means and the second moving means respectively move the plurality of first nozzles and the plurality of second nozzles along the straight path and/or the curved path.

25. The system for producing an electrode foil for an electrolytic capacitor according to claim 23, wherein the first moving means moves the plurality of first nozzles in a direction that is the same as or opposite to a conveying direction of the metal foil, or reciprocally over the conveyance path, in the first film-forming region.

26. The system for producing an electrode foil for an electrolytic capacitor according to claim 23, wherein the second moving means moves the plurality of second nozzles in a direction that is the same as or opposite to a conveying direction of the metal foil, or reciprocally over the conveyance path, in the second film-forming region.

27. The system for producing an electrode foil for an electrolytic capacitor according to claim 21, further comprising:

a conveyance roller that conveys the metal foil in a first film-forming region and a second film-forming region that is separate from the first film-forming region, wherein the film-forming portion includes:

a first film-forming device that supplies a first raw material gas to the first main surface in the first film-forming region; and a second film-forming device that supplies a second raw material gas to the second main surface in the second film-forming region.

28. The system for producing an electrode foil for an electrolytic capacitor according to claim 27, further comprising:

a conveyance roller that conveys the metal foil in the first film-forming region and the second film-forming region that is separate from the first film-forming region, wherein the first film-forming device supplies the first raw material gas to the first main surface while moving back and forth in the first film-forming region, and the second film-forming device supplies the second raw material gas to the second main surface while moving back and forth in the second film-forming region.

29. The system for producing an electrode foil for an electrolytic capacitor according to claim 27, wherein the first film-forming device includes a plurality of first nozzles that supply the first raw material gas to the first main surface, the second film-forming device includes a plurality of second nozzles that supply the second raw material gas to the second main surface, and the number of the first nozzles is different from the number of the second nozzles.

30. The system for producing an electrode foil for an electrolytic capacitor according to claim 27, wherein the conveyance roller conveys the metal foil in the order of the first film-forming region and the second film-forming region, the first film-forming device also serves as a first heat treatment device that performs heat treatment on the second main surface to form an oxide film of a metal portion constituting the second porous portion on the surface of the second porous portion, in the first film-forming region, and the second film-forming device also serves as a second heat treatment device that performs heat treatment on the first main surface having the first dielectric layer to increase a crystallinity of the first dielectric layer, in the second film-forming region.

31. The system for producing an electrode foil for an electrolytic capacitor according to claim 21, further comprising:

a conveyance roller that conveys the metal foil in a first film-forming region and a second film-forming region that is separate from the first film-forming region, and reciprocally moves the metal foil in each of the first film-forming region and the second film-forming region, wherein the film-forming portion includes:

a first film-forming device that supplies a first raw material gas to the first main surface in the first film-forming region; and a second film-forming device that supplies a second raw material gas to the second main surface in the second film-forming region.

32. The system for producing an electrode foil for an electrolytic capacitor according to claim 21, wherein a thickness F1 of the first dielectric layer and a thickness F2 of the second dielectric layer satisfy a relationship:

$$0.75 \leq F1/F2 \leq 0.97.$$

33. The system for producing an electrode foil for an electrolytic capacitor according to claim 21, wherein a capacitance C1 that appears on the first main surface side having the first dielectric layer and a capacitance C2 that appears on the second main surface side having the second dielectric layer satisfy a relationship:

$$0.80 \leq C2/C1 \leq 0.99.$$

* * * * *